(12) United States Patent
Dravneek et al.

(10) Patent No.: US 12,413,430 B2
(45) Date of Patent: Sep. 9, 2025

(54) PERFORMING DATA INTERACTIONS IN A VIRTUAL ENVIRONMENT

(71) Applicant: Bank of America Corporation, Charlotte, NC (US)

(72) Inventors: Victoria Lynn Dravneek, Charlotte, NC (US); Manu Jacob Kurian, Dallas, TX (US); Ana Maxim, Arlington, VA (US)

(73) Assignee: Bank of America Corporation, Charlotte, NC (US)

( * ) Notice: Subject to any disclaimer, the term of this patent is extended or adjusted under 35 U.S.C. 154(b) by 297 days.

(21) Appl. No.: 18/057,920

(22) Filed: Nov. 22, 2022

(65) Prior Publication Data

US 2024/0171413 A1   May 23, 2024

(51) Int. Cl.
*H04L 9/00* (2022.01)
*H04L 9/32* (2006.01)

(52) U.S. Cl.
CPC .............. *H04L 9/50* (2022.05); *H04L 9/3213* (2013.01); *H04L 9/3273* (2013.01)

(58) Field of Classification Search
CPC ........ H04L 9/50; H04L 9/3213; H04L 9/3273
See application file for complete search history.

(56) References Cited

U.S. PATENT DOCUMENTS

| | | | |
|---|---|---|---|
| 8,082,297 B2 | 12/2011 | Syvain et al. | |
| 8,631,417 B1 | 1/2014 | Mendes Da Costa et al. | |
| 9,165,426 B2 | 10/2015 | Jones et al. | |
| 9,342,211 B2 | 5/2016 | Deluca et al. | |
| 10,326,667 B2 | 6/2019 | Jones et al. | |
| 10,587,584 B2 | 3/2020 | Vikramaratne et al. | |
| 10,610,787 B2 | 4/2020 | Hamilton, II et al. | |
| 10,931,650 B1 | 2/2021 | Mccown et al. | |
| 10,981,069 B2 | 4/2021 | Kawachiya et al. | |
| 11,170,003 B2 | 11/2021 | Wu et al. | |
| 12,086,630 B2 * | 9/2024 | Hwang | G06F 9/4868 |
| 2007/0254631 A1 | 11/2007 | Spooner | |
| 2010/0250383 A1 | 9/2010 | Frazier et al. | |
| 2010/0333031 A1 * | 12/2010 | Castelli | G06F 16/95 715/848 |
| 2011/0072367 A1 | 3/2011 | Bauer | |
| 2014/0026078 A1 | 1/2014 | Dawson et al. | |
| 2018/0104595 A1 | 4/2018 | Kawachiya et al. | |
| 2018/0123816 A1 | 5/2018 | Tandon et al. | |

(Continued)

FOREIGN PATENT DOCUMENTS

KR    2713289 B1 *  10/2024  ......... G06F 16/9038

*Primary Examiner* — Carl G Colin
*Assistant Examiner* — Clayton Henry Hopkins

(57) ABSTRACT

A system includes a memory and a processor coupled to the memory. The processor receives a first user credential associated with a first user and authorizes a first avatar of the first user to enter a virtual environment. The processor receives a first request from the first user to receive virtual data objects for at least one target entity and, in response, generates a virtual sub-environment within the virtual environment. The processor authorizes a second user to access the virtual sub-environment and receives a set of conditions from the second user relating to how a first set of virtual data objects is to be distributed to the at least one target entity. The processor receives and transfers the first set of virtual data objects to the at least one target entity based on the set of conditions.

20 Claims, 3 Drawing Sheets

(56) References Cited

U.S. PATENT DOCUMENTS

| | | |
|---|---|---|
| 2020/0338458 A1 | 10/2020 | Huang et al. |
| 2021/0042748 A1 | 2/2021 | Sepulveda et al. |
| 2022/0180355 A1* | 6/2022 | Meredith, II ...... G06Q 20/3827 |
| 2023/0186307 A1* | 6/2023 | Park ...................... G06N 3/045 |
| | | 705/44 |
| 2024/0073198 A1* | 2/2024 | Lee ...................... H04L 63/083 |

* cited by examiner

PERFORMING DATA INTERACTIONS IN A VIRTUAL ENVIRONMENT

TECHNICAL FIELD

The present disclosure relates generally to network communication, and more specifically to performing data interactions in a virtual environment.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to securely access a virtual environment and perform secure data interactions in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, access to virtual sub-environments and other data interactions performed in real-world and virtual environments. For example, user information collected from the user and/or assigned to the user in a real-world environment may be used in a virtual environment (e.g., metaverse environment) to authenticate the user before allowing the user to access the virtual environment and perform any kind of action or interaction within the virtual environment. Additionally or alternatively, as described in embodiments of the present disclosure, user information collected from the user and/or assigned to the user in the real-world environment may be used in the virtual environment (e.g., metaverse environment) to provide access to the user to a virtual sub-environment within the virtual environment. This process provides improved information security because it authenticates that an avatar is associated with the user and not an unauthorized party and that the user is authorized to access the virtual environment and the virtual sub-environment. By improving interoperability of real-world systems and virtual-world systems, the disclosed system and methods generally improve computer networking technology.

The disclosed system and methods provide the additional practical application of recording data interactions performed in the virtual environment and/or the real-world environment in a blockchain. Blockchain supports immutability which means that data transactions once recorded in the blockchain cannot be erased, changed, or replaced. The immutability of the blockchain significantly reduces the chances of data tampering within the network and makes the system significantly secure as compared to traditional client-server architecture. The blockchain further helps ensure traceability and accountability in the event of an unauthorized and malicious activity.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the need to store the same data (e.g., authentication data, login credentials, etc.) in both systems, as data stored in one system can be accessed, or otherwise leveraged, by the other system. This saves memory resources by avoiding duplication of data. The saving of memory resources may leave more system memory for storing other data used in other technical operations. This provides the additional technical advantage of improving processing efficiency of computing systems that manage the real-world and virtual word environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
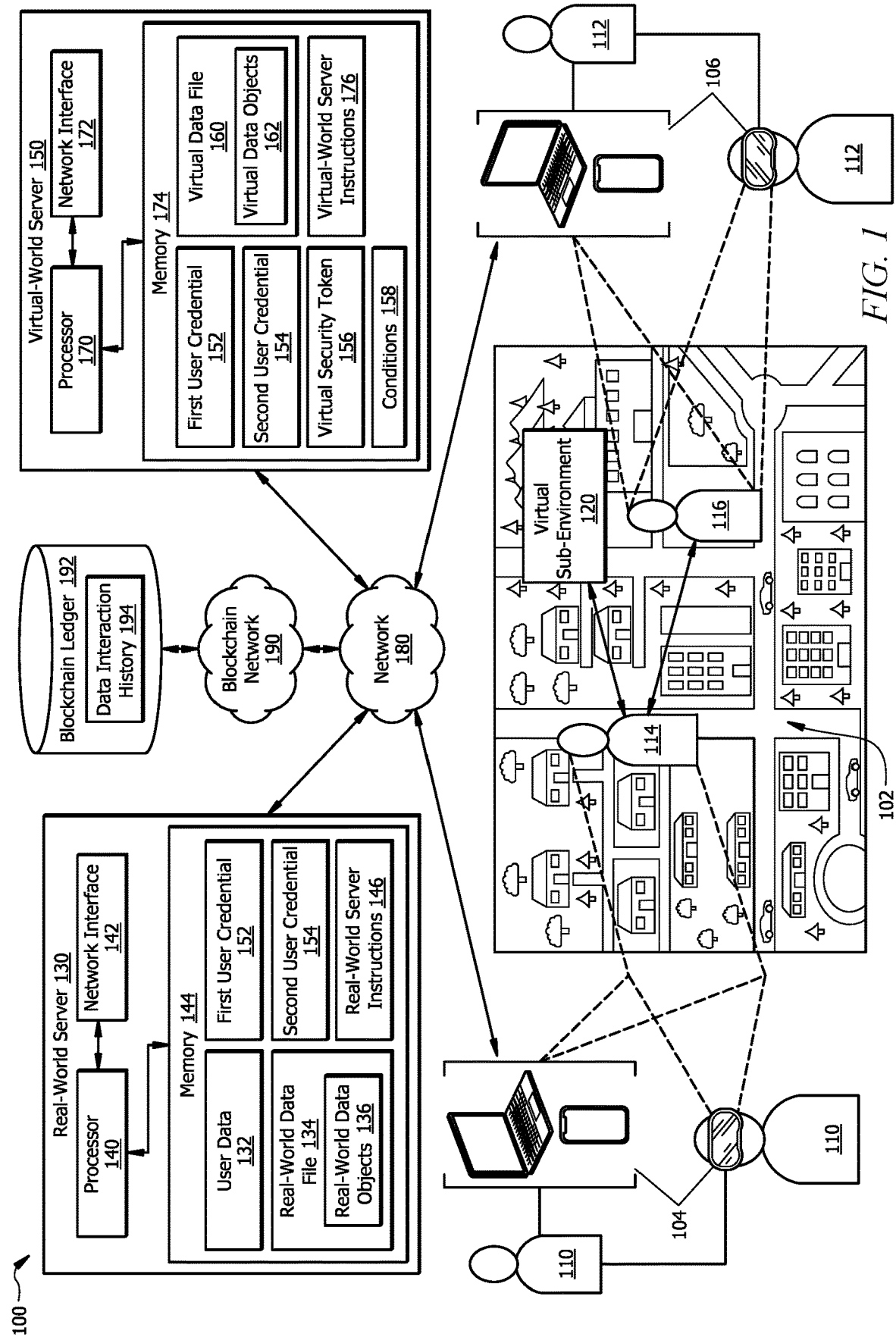
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, virtual-world server 150 and a blockchain network 190, each connected to a network 180. A first user 110 is associated with the first user device 104 and a second user 112 is associated with the second user device 106. The system 100 may be communicatively coupled to the communication network 180 and may be operable to transmit data between each one of the first user device 104, second user device 106, real-world server 130, virtual-world server 150, and blockchain network 190 through the communication network 180.

In general, the system 100 may improve interoperability of real-world systems and virtual world systems (e.g., metaverse systems) so that information may be seamlessly shared between these systems to implement data security, authorization of data interactions, access to virtual sub-environments and other data interactions performed in real-world and virtual environments. For example, user information collected from the user and/or assigned to the user in a real-world environment may be used in a virtual environment 102 (e.g., metaverse environment) to authenticate the first user 110 before allowing the first user 110 to access the virtual environment 102 and perform any kind of action or interaction within the virtual environment 102. Additionally or alternatively, as described in embodiments of the present disclosure, user information collected from the first user 110 and/or assigned to the first user 110 in the real-world environment may be used in the virtual environment 102 (e.g., metaverse environment) to provide access to the first user 110 to a virtual sub-environment 120 within the virtual environment 102. This process provides improved information security because it authenticates that a first avatar 114 is associated with the first user 110, not an unauthorized party, and that the first user 110 is authorized to access the virtual environment 102 and the virtual sub-environment 120. Additionally or alternatively, as described in embodiments of the present disclosure, data interactions are performed in the real-world environment by the real-world server 130 based on data interactions performed in the virtual environment by the virtual-world server 150. Further, information relating to data interactions performed in the real-world environment by the real-world server 130 is communicated to the virtual-world server 150 for presenting to the first user 110 in the virtual environment 102 or virtual sub-environment 120 and for recording in a blockchain network 190.

It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment 102 (e.g., a metaverse environment). Further, it may be noted that while certain embodiments of the present disclosure may be described in the context of a metaverse environment which is an example of a virtual environment 102, the methods discussed in this disclosure apply to any other virtual environment 102. The terms "virtual environment" and "metaverse environment" are used interchangeably throughout this disclosure. Furthermore, it may be noted that while certain embodiments of this disclosure describe one or more operations in relation to the first user 110, these embodiments apply to any other user (e.g., second user 112) connected to network 180.

The first user 110 may access the virtual environment 102 (e.g., a metaverse environment) through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 114 for the first user 110). An avatar is a graphical representation of a user at a virtual location within the virtual environment 102. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at a physical location in the real-world environment or being in transit in the real-world environment.

While engaging in the virtual environment 102 via the first avatar 114, the first user 110 may interact with a plurality of other users, objects and/or entities (e.g., virtual sub-environment 120) through a respective avatar. For example, the second user 112 may attempt to engage in an interaction session with the first avatar 114 through a second avatar 116 associated with the second user 112. In another example, the first avatar 114 of the first user 110 may access a virtual sub-environment 120 within the virtual environment 102 and perform virtual data interactions within the virtual sub-environment 120. In the real-world environment, the second user 112 may be physically located at a distance away from the first user 110. The second user 112 may access the virtual environment 102 through the second user device 106 to control the second avatar 116 and attempt to engage in an interaction session with the first user 110 through the first avatar 114.

Before the interaction between the first avatar 114 and the second avatar 116 occurs or the first avatar 114 can access the virtual sub-environment 120, the virtual-world server 150 may authenticate that the first avatar 114 is associated with the first user 110 and not an unauthorized third-party. For example, the first user 110 may be required to sign into a secure portal that provides access to a data file (e.g., real-world data file 134 and/or virtual data file 160) associated with the first user 110. As shown in FIG. 1, the real-world data file 134 of the first user 110 is stored and managed by the real-world server 130 and the virtual data file 160 of the first user 110 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160 and/or the real-world data file 134. The virtual data file 160 and the real-world data file 134 may include virtual data objects 162 and real-world data objects 136 respectively owned by the first user 110. The real-world server 130 and the virtual-world server 150 may store other information related to the first user 110 including, but not limited to, user profile information, account information (e.g., including identity and other details relating to the respective data files 134 and 160), avatar information, digital assets (e.g., respective real-world data objects 136 and virtual data objects 162) information, or any other suitable type of information that is associated with a user within the virtual environment 102 and/or the real-world environment.

As shown in FIG. 1, virtual-world server 150 comprises a processor 170, a memory 174, and a network interface 172. The processor 170 comprises one or more processors operably coupled to the memory 174. The processor 170 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 170 may be a programmable logic device, a microcontroller, a microprocessor, or any suitable combination of the preceding. The processor 170 is communicatively coupled to and in signal communication with the memory 174. The one or more processors are configured to process data and may be implemented in hardware or software. For example, the processor 170 may be 8-bit, 16-bit, 32-bit, 64-bit or of any other suitable architecture. The processor 170 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 176) to implement the virtual-world server 150. In this way, processor 170 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIGS. 1 and 3. For example, the processor 170 may be configured to perform at least a portion of the method 300 as described in FIG. 3.

The memory 174 comprises one or more disks, tape drives, or solid-state drives, and may be used as an over-flow data storage device, to store programs when such programs are selected for execution, and to store instructions and data that are read during program execution. The memory 174 may be volatile or non-volatile and may comprise a read-only memory (ROM), random-access memory (RAM), ternary content-addressable memory (TCAM), dynamic random-access memory (DRAM), and static random-access memory (SRAM).

The memory 174 is operable to store first user credential 152, second user credential 154, virtual security tokens 156, conditions 158, virtual data file 160, virtual data objects 162, and the virtual-world server instructions 176. The virtual-world server instructions 176 may include any suitable set of instructions, logic, rules, or code operable to execute the virtual-world server 150.

The network interface 172 is configured to enable wired and/or wireless communications. The network interface 172 is configured to communicate data between the virtual-world server 150 and other devices, systems, or domains (e.g. user devices 104 and 106, real-world server 130 and the blockchain network 190). For example, the network interface 172 may comprise a Wi-Fi interface, a LAN interface, a WAN interface, a modem, a switch, or a router. The processor 170 is configured to send and receive data using the network interface 172. The network interface 172 may be configured to use any suitable type of communication protocol as would be appreciated by one of ordinary skill in the art.

The real-world server 130 comprises a processor 140, a memory 144, and a network interface 142. The processor 140 comprises one or more processors operably coupled to the memory 144. The processor 140 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 140 may be a programmable logic device, a microcontroller, a microprocessor, or any suitable combination of the preceding. The processor 140 is communicatively coupled to and in signal communication with the memory 144. The one or more processors are configured to process data and may be implemented in hardware or software. For example, the processor 140 may be 8-bit, 16-bit, 32-bit, 64-bit or of any other suitable architecture. The processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 146) to implement the real-world server 130. In this way, processor 140 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIGS. 1 and 3. For example, the processor 140 may be configured to perform at least a portion of the method 300 as described in FIG. 3.

The memory 144 comprises one or more disks, tape drives, or solid-state drives, and may be used as an over-flow data storage device, to store programs when such programs are selected for execution, and to store instructions and data that are read during program execution. The memory 144 may be volatile or non-volatile and may comprise a read-only memory (ROM), random-access memory (RAM), ternary content-addressable memory (TCAM), dynamic random-access memory (DRAM), and static random-access memory (SRAM).

The memory 144 is operable to store information relating to user data 132, real-world data file 134, real-world data objects 136, first user credential 152, second user credential 154 and the real-world server instructions 146. The real-world server instructions 146 may include any suitable set of instructions, logic, rules, or code operable to execute the real-world server 130.

The network interface 142 is configured to enable wired and/or wireless communications. The network interface 142 is configured to communicate data between the real-world server 130 and other devices, systems, or domains (e.g. user devices 104 and 106, virtual-world server 150 and blockchain network 190). For example, the network interface 142 may comprise a Wi-Fi interface, a LAN interface, a WAN interface, a modem, a switch, or a router. The processor 140 is configured to send and receive data using the network interface 142. The network interface 142 may be configured to use any suitable type of communication protocol as would be appreciated by one of ordinary skill in the art.

Each of the real-world server 130 and the virtual-world server 150 is generally a suitable server (e.g., including a physical server and/or virtual server) operable to store data in a memory (e.g., respective memories 144 and 174) and/or provide access to application(s) or other services. One or both of the real-world server 130 and the virtual-world server 150 may be a backend server associated with a particular entity (e.g., organization) that facilitates conducting interactions between entities and one or more users. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in the virtual environment 102 (e.g., a metaverse environment). It may be noted that the operations performed by the real-world server 130 and the virtual-world server 150 described in embodiments of the present disclosure may be implemented by a single server.

The communication network 180 may facilitate communication within the system 100. This disclosure contemplates the communication network 180 being any suitable network operable to facilitate communication between the first user device 104, second user device 106, real-world server 130, virtual-world server 150 and blockchain network 190. Communication network 180 may include any interconnecting system capable of transmitting audio, video, signals, data, messages, or any combination of the preceding. Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130, virtual-world server 150 and/or blockchain network 190), databases, etc. through the communication network 180. Each of the user devices may be configured to perform specific functions described herein and interact with one or both of real-world server 130 and the virtual-world server 150, e.g., via respective user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
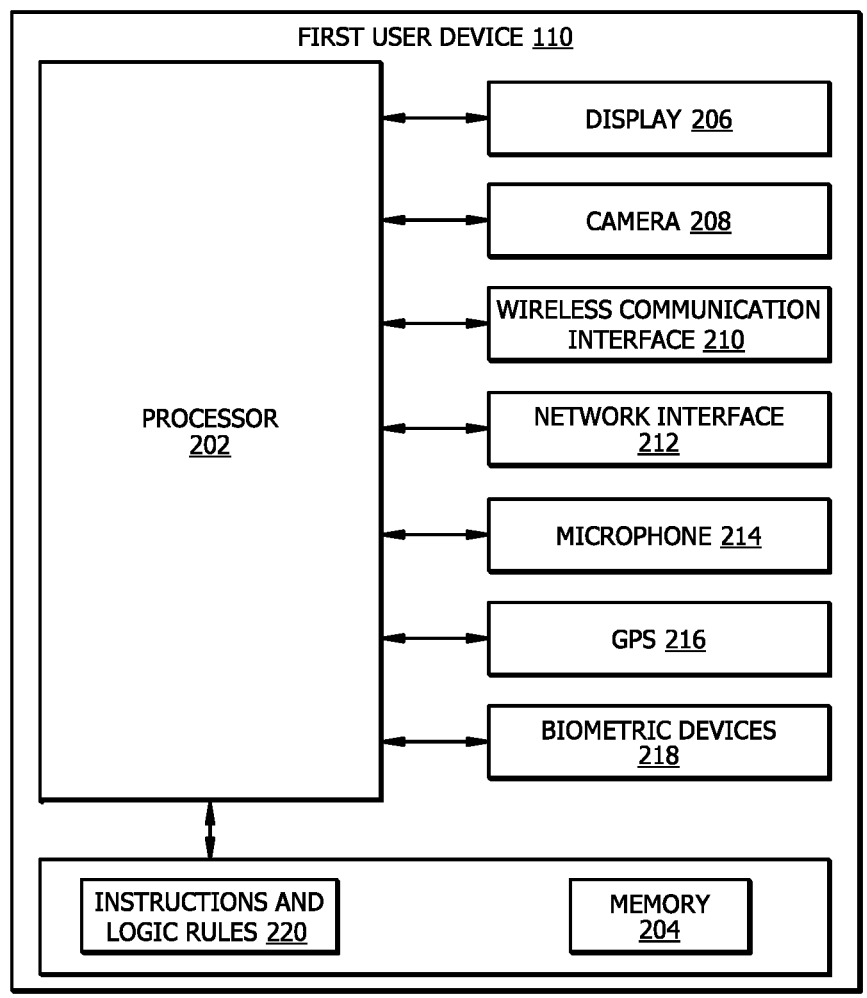
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1) or between the first user 110 and an entity (e.g., represented by a virtual entity in the virtual environment 102).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

Figure 3:
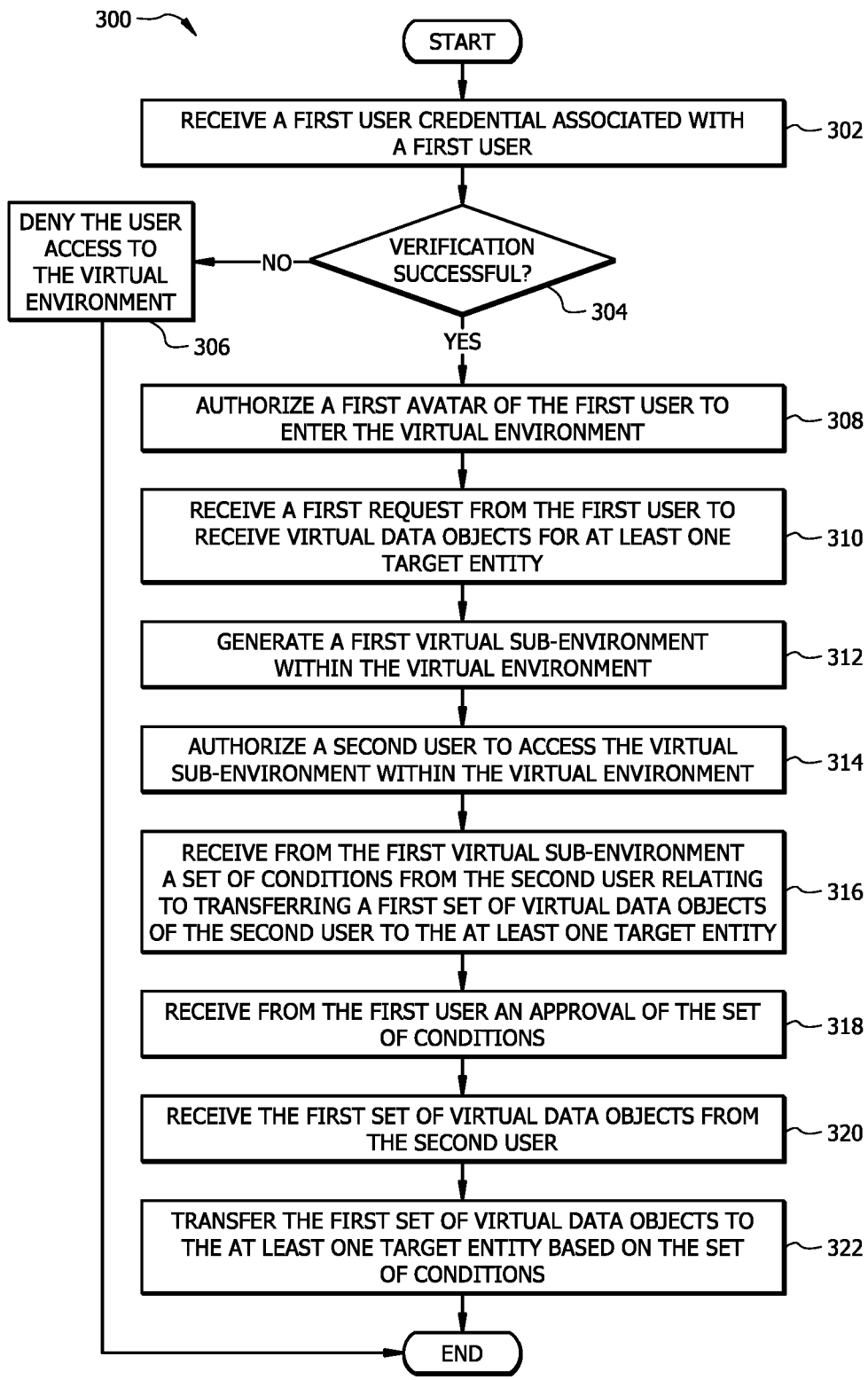
FIG. 3 illustrates a flowchart of an example method for performing data interactions in a virtual environment, in accordance with one or more embodiments of the present disclosure.

The memory 204 is operable to store any of the information described with respect to FIGS. 1 and 3 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user data 132), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain (s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, blockchain network 190 and one or more user devices (e.g., second user device 106) may be part of an Information Technology (IT) infrastructure of an entity or organization. For example, second user 112 may be a representative of the organization who may use the second user device 106 to enter the virtual environment 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the virtual environment 102 (e.g., a metaverse environment). In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the virtual environment 102 (e.g., a metaverse environment). In alternative embodiments, the real-world server 130 and the virtual-world server 150 may be owned and/or operated by different entities/organizations.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, assets owned by the user, and copies of government issued documents (e.g., drivers permit, state identity card etc.). This information is stored by real-world server 130 as part of user data 132 of the first user 110. In one embodiment, at least a portion of the user data 132 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 134 for the first user 110 in which the first user 110 may store real-world data objects 136 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 134 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be asked to provide information necessary to verify the identity of the first user 110 and register the first user 110 with the real-world server 130.

Information relating to the real-world data file 134 of the first user 110 may be stored as part of the user data 132 of the first user 110. This information may include, but is not limited to, an identity of the real-world data file 134, amount of real-world data objects 136 stored in the real-world data file 134, a log of data interactions conducted in relation to the real-world data file 134 and any other information relating to the real-world data file 134.

Once registered with the real-world server 130, the real-world server 130 may allow the first user 110 to perform one or more data interactions in the real-world environment. For example, a real-world data interaction may include transferring one or more real-world data objects 136 from the real-world data file 134 of the first user 110 to a second real-world data file (not shown) of the second user 112. Another example data interaction may include receiving one or more real-world data objects 136 in the real-world data file 134 of the first user 110 from the second real-world data file of the second user 112. Another example data interaction may include requesting by the first user 110 transfer of real-world data objects from a data file of a second user to a user data file of a third user as part of satisfying an agreement between the first user 110 and the third user. Another example data interaction may include modifying at least a portion of the user data 132 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or virtual environment 102 that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the real-world server 130. In one embodiment, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may offer the first user 110 an option to additionally register with the virtual-world server 150 which may allow the first user 110 to perform data interactions in the virtual environment 102. Registration with the virtual-world server 150 may include generating a first user credential 152 that allows the first user 110 to sign on to the virtual-world server 150 and enter the virtual environment 102 via first avatar 114 of the first user 110. Other users may register with the real-world server 130 and the virtual-world server 150 in a similar manner as the first user 110. For example, second user 112 may register with the virtual-world server 150 which may include generating a second user credential 154 that allows the second user 112 to sign on to the virtual-world server 150 and enter the virtual environment 102 via second avatar 116 of the second user 112.

Once registered with the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 134 of the first user 110. For example, the virtual data file 160 is a virtual image of the real-world data file 134, wherein the virtual data objects 162 correspond to the real-world data objects 136. In other words, the virtual data file 160 is a virtual representation of the real-world data file 134. In another example, the virtual data file 160 stores a portion of the real-world data objects 136 in the form of virtual data objects 162. In another example, real-world data objects 136 may be converted to virtual data objects 162, and vice versa. In this case, there may not be a one-to-one conversion between the real-world data objects 136 and virtual data objects 162. For example, one real-world data object 136 may be converted to a plurality of virtual data objects 162, wherein the conversion ratio may dynamically change from time to time.

Information relating to the virtual data file 160 of the first user 110 may be stored by the virtual-world server 150. This information may include, but is not limited to, an identity of the virtual data file 160, amount of virtual data objects 162 stored in the virtual data file 160, a log of virtual data interactions conducted in the virtual environment 102 in relation to the virtual data file 160 and any other information relating to the virtual data file 160.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112. Another example data interaction may include receiving one or more virtual data objects 162 in the virtual data file 160 of the first user 110 from the second virtual data file of the second user 112. Another example data interaction may include requesting by the first user 110 transfer of virtual data objects from a data file of a second user to a data file of a third user as part of satisfying an agreement between the first user 110 and the third user.

In one or more embodiments, the virtual data file (e.g. virtual data file 160) is a software application running on a computing node owned and/or operated by the respective user (e.g., first user 110). For example, when the first user 110 desires to receive virtual data objects 162 from a virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 180.

In one or more embodiments, virtual-world server 150 may be configured to record virtual-world data interactions performed in the virtual environment 102 and/or real-world data interactions performed in the real-world environment. For example, virtual-world server 150 and/or one or more user devices (e.g., 104, 106 etc.) connected to the network 180 may be part of the blockchain network 190 and virtual data interactions performed in the virtual environment 102 (e.g., by the virtual-world server 150 or users 110, 112 etc.) may be recorded as data interaction history 194 in the blockchain network 190 (e.g., stored in the blockchain ledger 192). As shown in FIG. 1, blockchain network 190 may be associated with a blockchain ledger 192. Each virtual-world data interaction record stored in the data interaction history 194 may relate to a distinct virtual-world data interaction performed in the virtual environment 102 and may include information relating to the virtual-world data interaction including, but not limited to, a type of the data interaction (e.g., sending virtual data objects 162, receiving virtual data objects 162, updating user data 132 etc.), a date and time the data interaction was performed, an identity of a sending data file (e.g., virtual data file 160), an identity of a receiving data file (e.g., virtual data file 160), an amount of virtual data objects 162 transferred (e.g., sent or received), and an identity of an entity or user (e.g., second user 112) with which the data interaction was performed. In and additional or alternative embodiment, the data interaction history 194 associated with the first user 110 may be stored as part of the user data 132 in the real-world server 130.

A blockchain generally is an open, decentralized and distributed digital ledger (e.g., blockchain ledger 192) consisting of records called blocks that are used to record data interactions across many computing nodes (e.g., virtual-world server 150, first user device 104, second user device 106 etc.). Each computing node of a blockchain network (e.g., blockchain network 190) may maintain a copy of the blockchain ledger 192. Logically, a blockchain is a chain of blocks which contains specific information. Once recorded, the data in any given block cannot be altered retroactively without alteration of all subsequent blocks, which requires consensus of the network majority. Each computing node within the blockchain network maintains, approves, and updates new entries. The system is controlled not only by separate individuals, but by everyone within the blockchain network. Each member ensures that all records and procedures are in order, which results in data validity and security. Thus, the distributed ledger can record interactions between two parties efficiently and in a verifiable and permanent way. By design, a blockchain is resistant to modification of the data. For use as a distributed ledger, a blockchain is typically managed by a peer-to-peer network collectively adhering to a protocol for inter-node communication and validating new blocks. In the context of the present disclosure, one or more computing nodes (e.g., virtual-world server, first user device 104, second user device 106 etc.) of the blockchain network 190 may store a copy of a blockchain ledger 192, wherein each copy of the blockchain ledger 192 includes a copy of the blockchain associated with the blockchain network 190.

Each computing node of a blockchain network (e.g., blockchain network 190) is configured to process new blocks generated for the blockchain and maintain a most recent copy of the blockchain in the respective ledgers. Any new interaction or activity within the blockchain network may trigger the building of a new block of the blockchain. An interaction may include a computing node (e.g., virtual-world server, first user device 104, second user device 106 etc.) of the blockchain network transmitting or receiving data from another computing node (e.g., virtual-world server, first user device 104, second user device 106 etc.) of the blockchain network or from a computing node (e.g., real-world server 130) that is not part of the blockchain network. Before a new block is added to the blockchain, it needs to be verified by a majority of the computing nodes in the blockchain network. For example, once a new block is created at a computing node belonging to the blockchain network 190, the new block is sent to each other computing node in the blockchain network 190. Each other computing node verifies the new block and checks whether the information stated in the new block is correct. Once approved by a majority of the computing nodes, the new block is added to the blockchain of the blockchain network 190. Once a new block is approved for addition to the blockchain, each of the computing nodes of the blockchain network 190 may be configured to update a local copy of the blockchain persisted in the respective ledger to reflect the addition of the new block.

Each block of the blockchain includes a hash of the block, a hash of the previous block, data that records one or more interactions or activities associated with the block, and a timestamp of the one or more interactions or activities recorded by the block. The data stored in each block depends on the type of blockchain. For example, the data included in each block may include information relating to the interaction recorded by the block including transmitting/receiving data, details of the data files, a copy of data received or generated as part of the interaction, identities of the sending and receiving nodes involved in the interaction etc. A hash of a block is like a fingerprint that uniquely identifies the block (and the interaction or activity recorded by the block) within the blockchain. Each hash of a block is generated based on a cryptographic hash algorithm. A blockchain network uses public-key cryptography to securely transfer data between computing nodes. Public-key cryptography uses a combination of a public key and private key to secure data in a blockchain network so that only the rightful owner of data can access the data. A public key is like an address on the blockchain to which data may be sent and recorded as belonging to that address. A private key is like a password that gives a user access to digital possessions recorded against a public key.

In one or more embodiments of the present disclosure, virtual-world server 150 may be configured to facilitate collection and distribution of data objects (virtual data objects 162 and/or real-world data objects 136) to one or more target entities. A target entity may be a user (e.g., first user 110, second user 112 etc.) or an organization. In an embodiment, the target entity may or may not be registered with the virtual-world server 150. In one example, the first user 110 may desire to collect virtual data objects 162 from one or more other users (e.g., second user 112) in the virtual environment 102 for distribution to one or more target entities. The first user 110 may gain access to the virtual environment 102 (e.g., using first user device 104) by providing the first user credential 152 of the first user 110 and may enter the virtual environment 102 (e.g., via first avatar 114). Virtual-world server 150 may be configured to receive the first user credential 152 from the first user 110, verify the identity of the first user 110 and authorize the first user 110 to access the virtual environment 102. Once the first user 110 has gained access to the virtual environment 102, the first user 110 may request (e.g., using the first user device 104) the virtual-world server 150 to receive virtual data objects 162 from other users in the virtual environment 102 for distribution to one or more target entities. The request from the first user 110 may include information relating to the one or more target entities including identities of the one or more target entities that are to receive virtual data objects 162 received from users based on virtual data interactions conducted by the users within the virtual environment 102. In response to receiving the request from the first user 110, virtual-world server 150 may be configured to generate a virtual sub-environment 120 which other users of the virtual environment 102 may access to transfer virtual data objects 162 for distribution to the one or more target entities.

A virtual sub-environment 120 may be a designated region within the virtual environment 102 for use by a user (e.g., first user 110) or an entity/organization. The virtual sub-environment 120 may take any form in the virtual environment 102 including, but not limited to, a virtual room, a virtual building or portions thereof, a virtual store, or any other designated virtual space/region within the virtual environment 102. The virtual sub-environment 120 is generated for a customized purpose such as for receiving virtual data objects 162 from users for distribution to specified one or more target entities and allows users (e.g., first user 110) of the virtual environment 102 to perform virtual data interactions including transferring virtual data objects 162 for distribution to the specified one or more target entities. Virtual-world server 150 may be configured to generate different virtual sub-environments 120 for different customized purposes. For example, based on a first request from a first user, virtual-world server 150 may generate a first virtual sub-environment for collection and distribution of virtual data objects to a first set of target entities. Further, based on a second request from a second user, virtual-world server 150 may generate a second virtual sub-environment for collection and distribution of virtual data objects to a second set of target entities. Users of the virtual environment 102 may use the first and/or second virtual sub-environments to transfer virtual data objects to the respective first and/or second set of target entities. In other words, virtual data objects received from users in the first virtual sub-environment are transferred to the first set of target entities and the virtual data objects received from users in the second virtual sub-environment are transferred to the second set of target entities.

The virtual sub-environment 120 may have restricted access such that only users who are registered to access the virtual sub-environment 120 may access the virtual sub-environment 120, while other users that have access to the virtual environment 102 but are not registered to access the virtual sub-environment 120 within the virtual environment 102 may not access the virtual sub-environment 120. In this context, it is important to have a mechanism that can help ensure that only authorized users can access the virtual sub-environment 120.

In some embodiments, gaining access to a virtual sub-environment 120 may include multiple steps. First, the second user 112 gains access to the virtual environment 102 using, for example, second user credential 154, as described below. Subsequently, the second user 112 gains access to the virtual sub-environment 120 within the virtual environment 102 using a virtual security token 156, as described below. In one or more embodiments, virtual-world server 150 may be configured to use a second user credential 154 collected from the second user 112, generated by the second user 112 or assigned to the second user 112 during real-world data interactions with the second user 112, to verify identity of the second user 112 in the virtual environment 102. Thus, the second user credential 154 provides the second user 112 access to the virtual environment 102. For example, the second user credential 154 may be used by the virtual-world server 150 to verify that the second avatar 116 belongs to and is controlled by the second user 112. For example, second user credential 154 may include a username and password generated by the second user 112 as part of registering with the real-world server 130 and/or virtual-world server 150. The virtual-world server 150 may allow the second user 112 to use the same username and password to enter the virtual environment 102 via second avatar 116.

Virtual-world server 150 may be configured to generate a virtual security token 156, that provides the second user 112 access to the virtual sub-environment 120 within the virtual environment 102. The virtual security token 156 may represent a virtual user credential that may include, but is not limited to, an encrypted keycard, a virtual token, a virtual tag or a virtual halo. In one embodiment, the virtual security token 156 includes an encrypted data file that can store information. The second user 112 may first enter the virtual environment 102 (e.g., via second avatar 116) using the second user credential 154 and then access the virtual sub-environment 120 using the virtual security token 156. Once the second avatar 116 of the second user 112 has accessed the virtual sub-environment 120, second user 112 may perform one or more virtual data interactions in the virtual sub-environment 120 including transferring virtual data objects 162 for distribution to one or more target entities associated with the virtual sub-environment 120.

The second user 112 may gain access to the virtual sub-environment 120 based on a relationship with the entity that manages the virtual environment 102. For example, a user who is registered with the real-world server 130 and/or virtual-world server 150 may automatically qualify to access the virtual sub-environment 120. The second user 112 may request the virtual-world server 150 to provide access to the virtual sub-environment 120. In response to receiving the request, virtual-world server 150 may check whether the second user 112 is registered with the real-world server 130 and/or virtual-world server 150. Upon determining that the second user 112 is registered with the real-world server 130 and/or the virtual-world server 150, virtual-world server 150 may generate the virtual security token 156 that provides to the second user 112 access to the virtual sub-environment 120.

In some embodiments, as further described below, virtual-world server 150 may be configured to provide a user (e.g., second user 112) access to the virtual sub-environment 120 based on approval from the first user 110 who requested setup of the virtual sub-environment 120 for distribution of data objects to one or more target entities.

Virtual-world server 150 may be configured to provide the second user 112 access to the virtual sub-environment 120 based on the virtual security token 156 previously generated for the second user 112. As described above, second user 112 may enter (e.g., using the second avatar 116) the virtual environment 102 based on the second user credential 154. After entering the virtual environment 102, the second user 112 using the second avatar 116 may navigate to the virtual sub-environment 120 within the virtual environment 102 and request access to the virtual sub-environment 120. The request for access may include the virtual security token 156 previously issued to the second user 112. Virtual-world server 150 may receive the request for access from the second user 112 including the virtual security token 156. Upon receiving the request from the second user 112 including the virtual security token 156, virtual-world server 150 determines whether the second avatar 116 is authorized to access the virtual sub-environment 120. In order to make this determination, the virtual-world server 150 first determines who (e.g., identity of the user) the virtual security token 156 was issued to. Additionally, virtual-world server 150 determines whether the avatar presenting the virtual security token 156 to request access to the virtual sub-environment 120 is associated to the user who was issued the virtual security token 156.

For example, in response to receiving the request, virtual-world server 150 may examine the user data 132 associated with the virtual security token 156. Based on the user data associated with the virtual security token 156, virtual-world server 150 may be configured to determine that the virtual security token 156 is associated with the second user 112. For example, user data 132 associated with the virtual security token 156 may include an identity of the second user 112. Based on the identity of the second user 112, virtual-world server 150 may determine that the virtual security token 156 was generated for the second user 112. Additionally or alternatively, based on the user data associated with the virtual security token 156, virtual-world server 150 may be configured to verify that the second avatar 116 presenting the virtual security token 156 for gaining access to the virtual sub-environment 120 is associated with the second user 112 and not an unauthorized third party. Virtual-world server 150 provides the second user (e.g., second avatar 116) access to the virtual sub-environment 120 upon successfully verifying the virtual security token 156 presented by the second user 112.

Virtual-world server may associate with the virtual sub-environment 120 the identities of the one or more target entities for which the virtual sub-environment 120 was generated. For example, when the first user 110 requests to receive virtual data objects 162 in the virtual environment 102 for distribution to a first set of target entities, virtual-world server 150 generates the virtual sub-environment 120 and associates with the virtual sub-environment 120 identities of one or more target entities in the first set of target entities specified by the first user 110. Virtual-world server 150 may be configured to transfer virtual data objects 162 received from users, based on data interactions conducted by the users from within the virtual sub-environment 120, to one or more target entities of the first set of target entities associated with the virtual sub-environment 120. For example, when the second user 112 gains access to the virtual sub-environment 120 as described above and transfers virtual data objects 162 in the virtual sub-environment 120, virtual-world server 150 automatically transfers the virtual data objects received from the second user 112, based on data interactions conducted by the user in the virtual sub-environment 120, to the one or more target entities of the first set of target entities associated with the virtual sub-environment 120. In one embodiment, the virtual data objects transferred by the second user 112 from within the virtual sub-environment 120 are stored in the virtual data file 160 of the first user 110. The virtual data objects are then distributed to the one or more target entities from the virtual data file 160 of the first user 110. In an alternative embodiment, virtual-world server 150 may generate a new virtual data file 160 and link the new virtual data file 160 with the virtual sub-environment 120. Virtual data objects transferred by users from within the virtual sub-environment 120 are automatically stored in the virtual data file 160 linked to the virtual sub-environment 120 and eventually distributed to the one or more target entities.

Virtual-world server 150 may be configured to transfer virtual data objects 162 received from the second user 112 to one or more target entities associated with the virtual sub-environment 120 based on one or more conditions 158 specified by the second user 112. For example, after gaining access to the virtual sub-environment 120, second user 112 may specify one or more conditions 158 relating to how virtual data objects received from the second user 112 are to be distributed to the one or more target entities associated with the virtual sub-environment 120. For example, the one or more conditions 158 may include a first condition specifying that a first portion of the virtual data objects received from the second user 112 is to be transferred to a first target entity of the one or more target entities associated with the virtual sub-environment 120. Further, the one or more conditions 158 may include a second condition specifying that a second portion of the virtual data objects received from the second user 112 is to be transferred to a second target entity of one or more target entities associated with the virtual sub-environment 120. For example, the second user 112 may specify that half of the virtual data objects received from the second user 112 is to be transferred to the first target entity and the remaining half is to be transferred to the second target entity.

Virtual-world server 150 may forward the one or more conditions 158 specified by the second user 112 to the first user 110 for approval. Upon receiving an approval from the first user 110 of the one or more conditions 158, virtual-world server 150 may notify the second user 112 of the approval by the first user 110. Once the one or more conditions 158 specified by the second user 112 are approved by the first user 110, virtual-world server 150 may be configured to distribute virtual data objects received from the second user 112 to the one or more target entities associated with the virtual sub-environment 120 based on the approved conditions 158. Following the example from the previous paragraph, virtual-world server 150 may transfer a first portion of virtual data objects received from the second user 112 to the first target entity and may transfer a second portion to the second target entity. Once the virtual data objects received from the second user 112 have been transferred to the target entities based on the conditions 158 specified by the second user 112, virtual-world server 150 notifies the second user 112 that the virtual data objects of the second user 112 have been transferred to the intended target entities based on the conditions 158 specified by the second user 112. For example, virtual-world server 150 sends a first indication to the second user 112 that the first portion of the data objects were transferred to the first target entity and sends a second indication to the second user 112 that the second portion of the data objects were transferred to the second target entity. The indication to the second user 112 may include a confirmation document from the respective first and second target entities including an amount of virtual data objects received by the respective target entities. Thus, the indication from the virtual-world server 150 serves as a confirmation for the second user 112 that the virtual data objects of the second user 112 were distributed to the target entities in accordance with the conditions 158 specified by the second user 112.

In one embodiment, the first user 110 may modify the one or more conditions 158 specified by the second user 112 and forward the modified conditions 158 to the virtual-world server 150. Virtual-world server 150 may forward the modified conditions 158 back to the second user 112. Upon receiving an acceptance of the modified conditions 158 from the second user 112, virtual-world server 150 applies the accepted modified conditions 158 to subsequent distributions of virtual data objects to the target entities.

In one embodiment, the second user 112 may request (e.g., using second user device 106) the virtual-world server 150 access to the virtual sub-environment 120, wherein the request for access includes the one or more conditions 158 relating to how virtual data objects received from the second user 112 are to be distributed to the one or more target entities associated with the virtual sub-environment 120. Upon receiving the access request from the second user 112, virtual-world server 150 forwards the one or more conditions specified by the second user 112 to the first user 110. The virtual-world server 150 provides the second user 112 access to the virtual sub-environment 120 only after the first user 110 approves the conditions 158 specified by the second user 112. For example, in response to receiving an approval of the conditions 158 specified by the second user 112, virtual-world server 150 generates the virtual security token 156 that provides the second user 112 access to the virtual sub-environment.

In certain embodiments, the conditions 158 specified by the second user 112 may include a condition that specifies that if the virtual data objects received from the second user 112 are not transferred to one or more target entities based on one or more conditions specified by the second user 112, then at least a portion of the virtual data objects are to be transferred back to the second user 112. For example, when the virtual-world server 150 detects that the first entity did not receive a first portion of the virtual data objects in accordance with conditions 158 specified by the second user 112, virtual-world server 150 transfers back the first portion of the virtual data objects (or all virtual data objects) to the second user 112.

It may be noted that different users accessing the virtual sub-environment 120 and transferring respective sets of virtual data objects in the virtual sub-environment 120 may specify different sets of conditions 158 based on which respective virtual data objects are to be distributed to the target entities. The virtual-world server may be configured to distribute virtual data objects 162 received from each user based on conditions 158 specified by the respective user.

Virtual-world server 150 may be configured to convert virtual data objects 162 received from users in the virtual sub-environment into real-world data objects 136. The real-world server 130 may be configured to transfer the converted real-world data objects 136 to the one or more target entities associated with the virtual sub-environment in the real-world environment. For example, virtual data objects 162 received from the second user 112 in the virtual sub-environment 120 may be converted into an equivalent amount of real-world data objects 136. Virtual-world server 150 may transfer the converted real-world data objects 136 to the target entities based on one or more conditions 158 specified by the second user. Following the example from the previous paragraphs, virtual-world server 150 may transfer to the first target entity a first amount of the converted real-world data objects 136 that is equivalent to the first portion of the corresponding virtual data objects 162. Additionally, virtual-world server 150 may transfer to the second target entity a second amount of the converted real-world data objects 136 that is equivalent to the second portion of the corresponding virtual data objects 162.

In certain embodiment, real-world server 130 may be configured to send to the virtual-world server 150 a confirmation of the transfer of real-world data objects 136 to the target entities in the real-world environment. The virtual-world server 150 may be configured to store in the blockchain ledger 192 the confirmations received from the real-world server 130. Storing information relating to the real-world data interactions relating to transfer of the real-world data objects 136 to the target entities enhances data security of the system 100 by storing these real-world data interactions in a permanent and transparent manner.

In a banking use case, the system and methods disclosed in accordance with embodiments of the present disclosure may allow a first user 110 to setup a virtual funding account (e.g., crowd funding account, charity account etc.) for one or more target entities in the virtual environment 102. As part of setting up the virtual funding account the virtual-world server 150 may generate the virtual sub-environment 120 in which other users (e.g., second user 112) may contribute digital funds for distribution to the one or more target entities associated with the virtual sub-environment. Digital funds collected from users in the virtual environment 102 may be transferred to the target entities in the virtual environment 102 or may be transferred as real-world currency in the real-world environment. In this context, the real-world server 130 may be owned and/or operated by the bank. The virtual-world server 150 may be operated by the same bank or may be operated by another entity. The real-world data file 134 may correspond to a real-world bank account of the first user 110 and the real-world data objects 136 may correspond to the real-world funds in the bank account of the first user 110. Similarly, virtual data file 160 may correspond to a digital wallet of the first user 110 and the virtual data objects 162 may correspond to digital currency.

FIG. 3 illustrates a flowchart of an example method 300 for performing data interactions in a virtual environment 102, in accordance with one or more embodiments of the present disclosure. Method 300 may be performed by the virtual-world server 150 shown in FIG. 1.

At operation 302, virtual-world server 150 receives a first user credential 152 associated with a first user 110, wherein the first user credential 152 provides the first user 110 access to a virtual environment 102.

At operation 304, virtual-world server 150 checks, based on the first user credential 152, whether the first user 110 is authorized to access the virtual environment 102. If the first user 110 is found to be not authorized to access the virtual environment 102, method 300 proceeds to operation 306 wherein virtual-world server 150 denies the first user 110 access to the virtual environment 102. On the other hand, if the first user 110 is found to be authorized to access the virtual environment 102, method 300 proceeds to operation 308, where the virtual-world server 150 authorizes, a first avatar 114 of the first user 110 to enter the virtual environment 102.

As described above, virtual-world server 150 may be configured to use a first user credential 152 collected from the first user 110, generated by the first user 110 or assigned to the first user 110 during real-world data interactions with the first user 110, to verify identity of the first user 110 in the virtual environment 102. Thus, the first user credential 152 provides the first user 110 access to the virtual environment 102. For example, the first user credential 152 may be used by the virtual-world server 150 to verify that the first avatar 114 belongs to and is controlled by the first user 110.

In one example, first user credential 152 may include a username and password generated by the first user 110 as part of registering with the real-world server 130. The virtual-world server 150 may allow the first user 110 to use the same username and password to enter the virtual environment 102 via first avatar 114. In an alternative embodiment, the first user 110 may generate a separate user credential (different from the first user credential 152) as part of registering with the real-world server 130 and use the separate user credential to log into the real-world server 130 and perform real-world data interaction. The first user 110 may separately generate first user credential 152 as part of registering with the virtual-world server 150 (e.g., during a real-world data interaction with the real-world server 130). Once the first user 110 has registered with the virtual-world server 150 and generated the first user credential 152, the first user 110 may use the first user credential 152 to log into the virtual-world server 150, gain access to the virtual environment 102 and perform virtual-world data interactions in within the virtual environment 102.

At operation 310, virtual-world server 150 receive a first request from the first user 110 to receive virtual data objects 162 from one or more other users (e.g., second user 112) in the virtual environment 102, wherein the first request comprises information relating to at least one target entity that is to receive the virtual data objects 162 that are received from the one or more other users.

As described above, virtual-world server 150 may be configured to facilitate collection and distribution of data objects (virtual data objects 162 and/or real-world data objects 136) to one or more target entities. A target entity may be a user (e.g., first user 110, second user 112 etc.) or an organization. In an embodiment, the target entity may or may not be registered with the virtual-world server 150. In one example, the first user 110 may desire to collect virtual data objects 162 from one or more other users (e.g., second user 112) in the virtual environment 102 for distribution to one or more target entities. The first user 110 may gain access to the virtual environment 102 (e.g., using first user device 104) by providing the first user credential 152 of the first user 110 and may enter the virtual environment 102 (e.g., via first avatar 114). Virtual-world server 150 may be configured to receive the first user credential 152 from the first user 110, verify the identity of the first user 110 and authorize the first user 110 to access the virtual environment 102. Once the first user 110 has gained access to the virtual environment 102, the first user 110 may request (e.g., using the first user device 104) the virtual-world server 150 to receive virtual data objects 162 from other users in the virtual environment 102 for distribution to one or more target entities. The request from the first user 110 may include information relating to the one or more target entities including identities of the one or more target entities that are to receive virtual data objects 162 received from users based on virtual data interactions conducted by the users within the virtual environment 102.

At operation 312, in response to receiving the first request, virtual-world server 150 generates a virtual sub-environment (e.g., virtual sub-environment 120) within the virtual environment 102, wherein the first virtual sub-environment is associated with the at least one target entity that is to receive the virtual data objects 162.

As described above, in response to receiving the request from the first user 110, virtual-world server 150 may be configured to generate a virtual sub-environment 120 which other users of the virtual environment 102 may access to transfer virtual data objects 162 for distribution to the one or more target entities.

A virtual sub-environment 120 may be a designated region within the virtual environment 102 for use by a user (e.g., first user 110) or an entity/organization. The virtual sub-environment 120 may take any form in the virtual environment 102 including, but not limited to, a virtual room, a virtual building or portions thereof, a virtual store, or any other designated virtual space/region within the virtual environment 102. The virtual sub-environment 120 is generated for a customized purpose such as for receiving virtual data objects 162 from users for distribution to specified one or more target entities and allows users (e.g., first user 110) of the virtual environment 102 to perform virtual data interactions including transferring virtual data objects 162 for distribution to the specified one or more target entities. Virtual-world server 150 may be configured to generate different virtual sub-environments 120 for different customized purposes. For example, based on a first request from a first user, virtual-world server 150 may generate a first virtual sub-environment for collection and distribution of virtual data objects to a first set of target entities. Further, based on a second request from a second user, virtual-world server 150 may generate a second virtual sub-environment for collection and distribution of virtual data objects to a second set of target entities. Users of the virtual environment 102 may use the first and/or second virtual sub-environments to transfer virtual data objects to the respective first and/or second set of target entities. In other words, virtual data objects received from users in the first virtual sub-environment are transferred to the first set of target entities and the virtual data objects received from users in the second virtual sub-environment are transferred to the second set of target entities.

At operation 314, virtual-world server 150 authorizes a second user 112 to access the virtual sub-environment within the virtual environment 102.

As described above, virtual sub-environment 120 may have restricted access such that only users who are registered to access the virtual sub-environment 120 may access the virtual sub-environment 120, while other users that have access to the virtual environment 102 but are not registered to access the virtual sub-environment 120 within the virtual environment 102 may not access the virtual sub-environment 120. In this context, it is important to have a mechanism that can help ensure that only authorized users can access the virtual sub-environment 120.

In some embodiments, gaining access to a virtual sub-environment 120 may include multiple steps. First, the second user 112 gains access to the virtual environment 102 using, for example, second user credential 154, as described below. Subsequently, the second user 112 gains access to the virtual sub-environment 120 within the virtual environment 102 using a virtual security token 156, as described below. In one or more embodiments, virtual-world server 150 may be configured to use a second user credential 154 collected from the second user 112, generated by the second user 112 or assigned to the second user 112 during real-world data interactions with the second user 112, to verify identity of the second user 112 in the virtual environment 102. Thus, the second user credential 154 provides the second user 112 access to the virtual environment 102. For example, the second user credential 154 may be used by the virtual-world server 150 to verify that the second avatar 116 belongs to and is controlled by the second user 112. For example, second user credential 154 may include a username and password generated by the second user 112 as part of registering with the real-world server 130 and/or virtual-world server 150. The virtual-world server 150 may allow the second user 112 to use the same username and password to enter the virtual environment 102 via second avatar 116.

Virtual-world server 150 may be configured to generate a virtual security token 156, that provides the second user 112 access to the virtual sub-environment 120 within the virtual environment 102. The virtual security token 156 may represent a virtual user credential that may include, but is not limited to, an encrypted keycard, a virtual token, a virtual tag or a virtual halo. In one embodiment, the virtual security token 156 includes an encrypted data file that can store information. The second user 112 may first enter the virtual environment 102 (e.g., via second avatar 116) using the second user credential 154 and then access the virtual sub-environment 120 using the virtual security token 156. Once the second avatar 116 of the second user 112 has accessed the virtual sub-environment 120, second user 112 may perform one or more virtual data interactions in the virtual sub-environment 120 including transferring virtual data objects 162 for distribution to one or more target entities associated with the virtual sub-environment 120.

The second user 112 may gain access to the virtual sub-environment 120 based on a relationship with the entity that manages the virtual environment 102. For example, a user who is registered with the real-world server 130 and/or virtual-world server 150 may automatically qualify to access the virtual sub-environment 120. The second user 112 may request the virtual-world server 150 to provide access to the virtual sub-environment 120. In response to receiving the request, virtual-world server 150 may check whether the second user 112 is registered with the real-world server 130 and/or virtual-world server 150. Upon determining that the second user 112 is registered with the real-world server 130 and/or the virtual-world server 150, virtual-world server 150 may generate the virtual security token 156 that provides to the second user 112 access to the virtual sub-environment 120.

In some embodiments, virtual-world server 150 may be configured to provide a user (e.g., second user 112) access to the virtual sub-environment 120 based on approval from the first user 110 who requested setup of the virtual sub-environment 120 for distribution of data objects to one or more target entities.

Virtual-world server 150 may be configured to provide the second user 112 access to the virtual sub-environment 120 based on the virtual security token 156 previously generated for the second user 112. As described above, second user 112 may enter (e.g., using the second avatar 116) the virtual environment 102 based on the second user credential 154. After entering the virtual environment 102, the second user 112 using the second avatar 116 may navigate to the virtual sub-environment 120 within the virtual environment 102 and request access to the virtual sub-environment 120. The request for access may include the virtual security token 156 previously issued to the second user 112. Virtual-world server 150 may receive the request for access from the second user 112 including the virtual security token 156. Upon receiving the request from the second user 112 including the virtual security token 156, virtual-world server 150 determines whether the second avatar 116 is authorized to access the virtual sub-environment 120. In order to make this determination, the virtual-world server 150 first determines who (e.g., identity of the user) the virtual security token 156 was issued to. Additionally, virtual-world server 150 determines whether the avatar presenting the virtual security token 156 to request access to the virtual sub-environment 120 is associated to the user who was issued the virtual security token 156.

For example, in response to receiving the request, virtual-world server 150 may examine the user data 132 associated with the virtual security token 156. Based on the user data associated with the virtual security token 156, virtual-world server 150 may be configured to determine that the virtual security token 156 is associated with the second user 112. For example, user data 132 associated with the virtual security token 156 may include an identity of the second user 112. Based on the identity of the second user 112, virtual-world server 150 may determine that the virtual security token 156 was generated for the second user 112. Additionally or alternatively, based on the user data associated with the virtual security token 156, virtual-world server 150 may be configured to verify that the second avatar 116 presenting the virtual security token 156 for gaining access to the virtual sub-environment 120 is associated with the second user 112 and not an unauthorized third party. Virtual-world server 150 provides the second user (e.g., second avatar 116) access to the virtual sub-environment 120 upon successfully verifying the virtual security token 156 presented by the second user 112.

At operation 316, virtual-world server 150 receives a set of conditions 158 from the second user specifying how a first set of virtual data objects 162 of the second user 112 are to be distributed to the at least one target entity associated with the virtual sub-environment.

As described above, virtual-world server 150 may be configured to transfer virtual data objects 162 received from the second user 112 to one or more target entities associated with the virtual sub-environment 120 based on one or more conditions 158 specified by the second user 112. For example, after gaining access to the virtual sub-environment 120, second user 112 may specify one or more conditions 158 relating to how virtual data objects received from the second user 112 are to be distributed to the one or more target entities associated with the virtual sub-environment 120. For example, the one or more conditions 158 may include a first condition specifying that a first portion of the virtual data objects received from the second user 112 is to be transferred to a first target entity of the one or more target entities associated with the virtual sub-environment 120. Further, the one or more conditions 158 may include a second condition specifying that a second portion of the virtual data objects received from the second user 112 is to be transferred to a second target entity of one or more target entities associated with the virtual sub-environment 120. For example, the second user 112 may specify that half of the virtual data objects received from the second user 112 is to be transferred to the first target entity and the remaining half is to be transferred to the second target entity.

At operation 318, virtual-world server 150 receives from the first user 110 an approval of the set of conditions 158 received from the second user 112.

As described above, virtual-world server 150 may forward the one or more conditions 158 specified by the second user 112 to the first user 110 for approval. Upon receiving an approval from the first user 110 of the one or more conditions 158, virtual-world server 150 may notify the second user 112 of the approval by the first user 110. Once the one or more conditions 158 specified by the second user 112 are approved by the first user 110, virtual-world server 150 may be configured to distribute virtual data objects received from the second user 112 to the one or more target entities associated with the virtual sub-environment 120 based on the approved conditions 158. Following the example from the previous paragraph, virtual-world server 150 may transfer a first portion of virtual data objects received from the second user 112 to the first target entity and may transfer a second portion to the second target entity. Once the virtual data objects received from the second user 112 have been transferred to the target entities based on the conditions 158 specified by the second user 112, virtual-world server 150 notifies the second user 112 that the virtual data objects of the second user 112 have been transferred to the intended target entities based on the conditions 158 specified by the second user 112. For example, virtual-world server 150 sends a first indication to the second user 112 that the first portion of the data objects were transferred to the first target entity and sends a second indication to the second user 112 that the second portion of the data objects were transferred to the second target entity. The indication to the second user 112 may include a confirmation document from the respective first and second target entities including an amount of virtual data objects received by the respective target entities. Thus, the indication from the virtual-world server 150 serves as a confirmation for the second user 112 that the virtual data objects of the second user 112 were distributed to the target entities in accordance with the conditions 158 specified by the second user 112.

In one embodiment, the first user 110 may modify the one or more conditions 158 specified by the second user 112 and forward the modified conditions 158 to the virtual-world server 150. Virtual-world server 150 may forward the modified conditions 158 back to the second user 112. Upon receiving an acceptance of the modified conditions 158 from the second user 112, virtual-world server 150 applies the accepted modified conditions 158 to subsequent distributions of virtual data objects to the target entities.

In one embodiment, the second user 112 may request (e.g., using second user device 106) the virtual-world server 150 access to the virtual sub-environment 120, wherein the request for access includes the one or more conditions 158 relating to how virtual data objects received from the second user 112 are to be distributed to the one or more target entities associated with the virtual sub-environment 120. Upon receiving the access request from the second user 112, virtual-world server 150 forwards the one or more conditions specified by the second user 112 to the first user 110. The virtual-world server 150 provides the second user 112 access to the virtual sub-environment 120 only after the first user 110 approves the conditions 158 specified by the second user 112. For example, in response to receiving an approval of the conditions 158 specified by the second user 112, virtual-world server 150 generates the virtual security token 156 that provides the second user 112 access to the virtual sub-environment.

At operation 320, virtual-world server 150 receives the first set of virtual data objects 162 from the second user 112, for example, based on a data interaction conducted by the second user 112 within the virtual sub-environment.

At operation 322, virtual-world server 150 transfers the first set of virtual data objects 162 to the at least one target entity based on the set of conditions 158 specified by the second user 112.

As described above, virtual-world server 150 may be configured to convert virtual data objects 162 received from users in the virtual sub-environment into real-world data objects 136. The real-world server 130 may be configured to transfer the converted real-world data objects 136 to the one or more target entities associated with the virtual sub-environment in the real-world environment. For example, virtual data objects 162 received from the second user 112 in the virtual sub-environment 120 may be converted into an equivalent amount of real-world data objects 136. Virtual-world server 150 may transfer the converted real-world data objects 136 to the target entities based on one or more conditions 158 specified by the second user. Following the example from the previous paragraphs, virtual-world server 150 may transfer to the first target entity a first amount of the converted real-world data objects 136 that is equivalent to the first portion of the corresponding virtual data objects 162. Additionally, virtual-world server 150 may transfer to the second target entity a second amount of the converted real-world data objects 136 that is equivalent to the second portion of the corresponding virtual data objects 162.

In certain embodiment, real-world server 130 may be configured to send to the virtual-world server 150 a confirmation of the transfer of real-world data objects 136 to the target entities in the real-world environment. The virtual-world server 150 may be configured to store in the blockchain ledger 192 the confirmations received from the real-world server 130. Storing information relating to the real-world data interactions relating to transfer of the real-world data objects 136 to the target entities enhances data security of the system 100 by storing these real-world data interactions in a permanent and transparent manner.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory that stores a first user credential associated with a first user and a second user credential associated with a second user; and
at least one processor coupled to the memory, and configured to:
receive the first user credential associated with the first user, wherein the first user credential provides the first user access to a virtual environment;
authorize, based on the first user credential, a first avatar of the first user to enter the virtual environment;
receive a first request from the first user to receive virtual data objects from one or more other users in the virtual environment, wherein the first request comprises information relating to at least one target entity that is to receive the virtual data objects received from the one or more other users;
in response to receiving the first request, generate a first virtual sub-environment within the virtual environment, wherein the first virtual sub-environment is associated with identities of the respective at least one target entity specified in the first request that is to receive the virtual data objects and can only be used by the one or more other users to transfer the virtual data objects for the at least one target entity;
generate a virtual data file;
link the virtual data file to the first virtual sub-environment, wherein the virtual data objects transferred by the one or more other users in the first virtual sub-environment are automatically stored in the virtual data file for distribution to the at least one target entity associated with the first virtual sub-environment;
receive the second user credential associated with the second user, wherein the second user credential provides the second user access to the virtual environment;
authorize, based on the second user credential, a second avatar of the second user to enter the virtual environment;
receive a second request from the second user to access the first virtual sub-environment within the virtual environment;
authorize the second avatar of the second user to access the first virtual sub-environment;
receive a set of conditions from the second user specifying how a first set of virtual data objects of the second user are to be distributed to the at least one target entity;
receive from the first user an approval of the set of conditions;
receive from the second user the first set of virtual data objects;
store the first set of virtual data objects in the virtual data file;
convert the first set of virtual data objects stored in the virtual data file to a first set of real-world data objects; and
transfer the first set of real-world data objects to the at least one target entity based on the set of conditions.

2. The system of claim 1, wherein:
the set of conditions comprises:
a first condition specifying that a first portion of the first set of virtual data objects is to be transferred to a first target entity of the at least one target entity; and
a second condition specifying that a second portion of the first set of virtual data objects is to be transferred to a second target entity of the at least one target entity.

3. The system of claim 2, wherein the at least one processor is configured to transfer the first set of real-world data objects to the at least one target entity by:
transferring to the first target entity a first portion of the first set of real-world data objects that is equivalent to the first portion of the first set of virtual data objects; and
transferring to the second target entity a second portion of the first set of real-world data objects that is equivalent to the second portion of the first set of virtual data objects.

4. The system of claim 3, wherein the at least one processor is further configured to:
send a first indication to the second user that the first portion of the first set of virtual data objects has been transferred to the first target entity; and
send a second indication to the second user that the second portion of the first set of virtual data objects has been transferred to the second target entity.

5. The system of claim 1, wherein the set of conditions comprises a condition which specifies if the first set of virtual data objects are not transferred to the at least one target entity based on at least a portion of the set of conditions, the first set of virtual data objects are to be transferred back to the second user.

6. The system of claim 5, wherein the at least one processor is further configured to:
detect that the first set of data objects were not transferred to at least one target entity based on at least the portion of the set of conditions; and
transfer back the first set of data objects to the second user.

7. The system of claim 1, wherein the at least one processor is further configured to:
authorize a plurality of users to access the first virtual sub-environment;
receive the virtual data objects from the plurality of users;
receive from the first virtual sub-environment a second set of conditions from one or more of the plurality of users relating to transferring the virtual data objects received from the one or more users to the at least one target entity;
convert the virtual data objects received from the plurality of users into real-world data objects; and
transfer the real-world data objects corresponding to the virtual data objects received from the one or more users to the at least one target entity based on the second set of conditions received from the one or more users.

8. The system of claim 1, wherein the at least one processor is further configured to:
receive a third request from a third user to receive the virtual data objects from users in the virtual environment, wherein the third request comprises information relating to at least one second target entity that is to receive the virtual data objects from the users;
in response to receiving the third request, generate a second virtual sub-environment within the virtual environment, wherein the second virtual sub-environment indicates information relating to the at least one second target entity that is to receive the virtual data objects;
authorize one or more users to access the second virtual sub-environment;
receive virtual data objects from the one or more users;
convert the virtual data objects into real-world data objects; and
transfer the virtual data objects to the at least one second target entity.

9. The system of claim 1, further comprising:
a blockchain network coupled to the at least one processor, wherein the at least one processor is further configured to store one or more data interactions performed by the at least one processor in a distributed ledger of the blockchain network.

10. A method for performing data interactions, comprising:
receiving a first user credential associated with a first user, wherein the first user credential provides the first user access to a virtual environment;
authorizing, based on the first user credential, a first avatar of the first user to enter the virtual environment;
receiving a first request from the first user to receive virtual data objects from one or more other users in the virtual environment, wherein the first request comprises information relating to at least one target entity that is to receive the virtual data objects received from the one or more other users;
in response to receiving the first request, generating a first virtual sub-environment within the virtual environment, wherein the first virtual sub-environment is associated with identities of the respective at least one target entity specified in the first request that is to receive the virtual data objects and can only be used by the one or more other users to transfer the virtual data objects for the at least one target entity;
generating a virtual data file;
linking the virtual data file to the first virtual sub-environment, wherein the virtual data objects transferred by the one or more other users in the first virtual sub-environment are automatically stored in the virtual data file for distribution to the at least one target entity associated with the first virtual sub-environment;
receiving a second user credential associated with a second user, wherein the second user credential provides the second user access to the virtual environment;
authorizing, based on the second user credential, a second avatar of the second user to enter the virtual environment;
receiving a second request from the second user to access the first virtual sub-environment within the virtual environment;
authorizing the second avatar of the second user to access the first virtual sub-environment;
receiving a set of conditions from the second user specifying how a first set of virtual data objects of the second user are to be distributed to the at least one target entity;
receiving from the first user an approval of the set of conditions;
receiving from the second user the first set of virtual data objects;
storing the first set of virtual data objects in the virtual data file;
converting the first set of virtual data objects stored in the virtual data file to a first set of real-world data objects; and
transferring the first set of real-world data objects to the at least one target entity based on the set of conditions.

11. The method of claim 10, wherein:
the set of conditions comprises:
a first condition specifying that a first portion of the first set of virtual data objects is to be transferred to a first target entity of the at least one target entity; and
a second condition specifying that a second portion of the first set of virtual data objects is to be transferred to a second target entity of the at least one target entity.

12. The method of claim 11, transferring the first set of real-world data objects to the at least one target entity comprises:
transferring to the first target entity a first portion of the first set of real-world data objects that is equivalent to the first portion of the first set of virtual data objects; and
transferring to the second target entity a second portion of the first set of real-world data objects that is equivalent to the second portion of the first set of virtual data objects.

13. The method of claim 12, further comprising:
sending a first indication to the second user that the first portion of the first set of virtual data objects has been transferred to the first target entity; and
sending a second indication to the second user that the second portion of the first set of virtual data objects has been transferred to the second target entity.

14. The method of claim 10, wherein the set of conditions comprises a condition which specifies if the first set of virtual data objects are not transferred to the at least one target entity based on at least a portion of the set of conditions, the first set of virtual data objects are to be transferred back to the second user.

15. The method of claim 14, further comprising:
detecting that the first set of data objects were not transferred to at least one target entity based on at least the portion of the set of conditions; and
transferring back the first set of data objects to the second user.

16. A non-transitory computer-readable medium storing instructions that when executed by a processor cause the processor to:
receive a first user credential associated with a first user, wherein the first user credential provides the first user access to a virtual environment;
authorize, based on the first user credential, a first avatar of the first user to enter the virtual environment;
receive a first request from the first user to receive virtual data objects from one or more other users in the virtual environment, wherein the first request comprises information relating to at least one target entity that is to receive the virtual data objects received from the one or more other users;
in response to receiving the first request, generate a first virtual sub-environment within the virtual environment, wherein the first virtual sub-environment is associated with identities of the respective at least one target entity specified in the first request that is to receive the virtual data objects and can only be used by the one or more other users to transfer the virtual data objects for the at least one target entity;
generate a virtual data file;
link the virtual data file to the first virtual sub-environment, wherein the virtual data objects transferred by the one or more other users in the first virtual sub-environment are automatically stored in the virtual data file for distribution to the at least one target entity associated with the first virtual sub-environment;

receive a second user credential associated with a second user, wherein the second user credential provides the second user access to the virtual environment;

authorize, based on the second user credential, a second avatar of the second user to enter the virtual environment;

receive a second request from the second user to access the first virtual sub-environment within the virtual environment;

authorize the second avatar of the second user to access the first virtual sub-environment;

receive a set of conditions from the second user specifying how a first set of virtual data objects of the second user are to be distributed to the at least one target entity;

receive from the first user an approval of the set of conditions;

receive from the second user the first set of virtual data objects;

store the first set of virtual data objects in the virtual data file;

convert the first set of virtual data objects stored in the virtual data file to a first set of real-world data objects; and transfer the first set of real-world data objects to the at least one target entity based on the set of conditions.

17. The non-transitory computer-readable medium of claim 16, wherein:
the set of conditions comprises:
a first condition specifying that a first portion of the first set of virtual data objects is to be transferred to a first target entity of the at least one target entity; and
a second condition specifying that a second portion of the first set of virtual data objects is to be transferred to a second target entity of the at least one target entity.

18. The non-transitory computer-readable medium of claim 17, wherein transferring the first set of real-world data objects to the at least one target entity comprises:
transferring to the first target entity a first portion of the first set of real-world data objects that is equivalent to the first portion of the first set of virtual data objects; and
transferring to the second target entity a second portion of the first set of real-world data objects that is equivalent to the second portion of the first set of virtual data objects.

19. The non-transitory computer-readable medium of claim 18, wherein the instructions further cause the processor to:
send a first indication to the second user that the first portion of the first set of virtual data objects has been transferred to the first target entity; and
send a second indication to the second user that the second portion of the first set of virtual data objects has been transferred to the second target entity.

20. The non-transitory computer-readable medium of claim 16, wherein the set of conditions comprises a condition which specifies if the first set of virtual data objects are not transferred to the at least one target entity based on at least a portion of the set of conditions, the first set of virtual data objects are to be transferred back to the second user.

* * * * *